(12) United States Patent
Ioannone et al.

(10) Patent No.: US 10,130,215 B2
(45) Date of Patent: Nov. 20, 2018

(54) COFFEE BEAN CONTAINER

(71) Applicant: Eugster / Frismag AG, Amriswil (CH)

(72) Inventors: Matteo Ioannone, Steinmaur (CH); Alain Roth, Kesswil (CH)

(73) Assignee: Eugster/Frismag AG, Amriswil (CH)

( * ) Notice: Subject to any disclaimer, the term of this patent is extended or adjusted under 35 U.S.C. 154(b) by 23 days.

(21) Appl. No.: 15/314,991

(22) PCT Filed: Dec. 4, 2014

(86) PCT No.: PCT/EP2014/076619
§ 371 (c)(1),
(2) Date: Nov. 30, 2016

(87) PCT Pub. No.: WO2015/180803
PCT Pub. Date: Dec. 3, 2015

(65) Prior Publication Data
US 2017/0112325 A1    Apr. 27, 2017

(30) Foreign Application Priority Data
May 30, 2014  (DE) .......................... 10 2014 107 647

(51) Int. Cl.
*A47J 42/50*  (2006.01)
*A47J 31/42*  (2006.01)

(52) U.S. Cl.
CPC .............. *A47J 42/50* (2013.01); *A47J 31/42* (2013.01)

(58) Field of Classification Search
CPC .. A47J 42/50; A47J 42/52; A47J 42/00; A47J 31/42

USPC .... 222/129, 136, 142.6–122.9, 142.6–12.94; 99/286
See application file for complete search history.

(56) References Cited

U.S. PATENT DOCUMENTS

| | | | | |
|---|---|---|---|---|
| 5,458,295 A | * | 10/1995 | Haber | A47J 42/50 241/100 |
| 5,845,857 A | | 12/1998 | Haber et al. | |
| 6,057,514 A | * | 5/2000 | Maguire | B01F 15/0445 177/105 |
| 6,572,036 B2 | * | 6/2003 | Glucksman | A47J 42/42 241/100 |

(Continued)

OTHER PUBLICATIONS

International search report for application No. PCT/EP2014/076619 dated Feb. 24, 2015.

*Primary Examiner* — Lien Ngo
(74) *Attorney, Agent, or Firm* — Bachman & LaPointe, PC

(57) ABSTRACT

Coffee bean container, in particular a double bean container, for releasably fixing on a coffee grinder or a coffee machine with an integrated coffee grinder, with a first bean compartment (3) comprising a first bean outlet (6) and with at least one second bean compartment (4) comprising a second bean outlet (6), with closure means (12) assigned to the bean outlets (5, 6) for closing the bean outlets (5, 6), with locking means (13) for locking the bean container to the coffee grinder or to the coffee machine, and with an actuating element (8) actuatable by a user and moveable relative to the bean compartments (3, 4), wherein the actuating element (8) is designed and arranged for both opening all bean outlets (5, 6) and for locking the locking means (13), in particular with a single actuating movement, and/or both for closing all bean outlets (5, 6) and unlocking the locking means (12), in particular with a single actuating movement.

16 Claims, 3 Drawing Sheets

(56) References Cited

U.S. PATENT DOCUMENTS

2004/0123747 A1\* 7/2004 Lassota .................. A47J 31/42
99/510

\* cited by examiner

COFFEE BEAN CONTAINER

BACKGROUND OF THE INVENTION

The invention relates to a coffee bean container, in particular a double bean container, for releasably fixing on a coffee grinder or a coffee machine with an integrated coffee grinder, in particular a bean-to-cup coffee machine, with multiple bean compartments separated from each other, each comprising a bean outlet through which coffee beans can exit the respective bean compartment in the direction of the coffee grinder. Such coffee bean multi-containers have so far usually been used in food service, i.e. in the professional environment, in order to be able to store and process different kinds of beans with a grinder, in particular aimed at producing different types of coffee and jointly supply different kinds of beans to the coffee grinder for adjusting the coffee's characteristics. Furthermore, the invention relates to a method for operating such a coffee bean container.

The above-mentioned coffee bean multi-containers, in particular double-bean containers, more and more become a part of the home environment, together with household coffee machines designed as bean-to-cup coffee machines. This particularly comes with the problem that unexperienced users tend to remove the coffee bean multi-container from the housing of a coffee grinder or a coffee machine after locking without previously closing the bean outlets, with the coffee beans falling out of the multiple open bean outlets as a result, which causes time-consuming cleaning works.

In single-use coffee bean containers, the above-mentioned problem has already been solved in that closing units have been provided for closing the only bean outlet. Such an arrangement is described in DE 203 00 928 U1, for example, in which the closing unit, respectively the movement of the closing element is mechanically coupled with a rotational movement of the coffee bean container per se. Such solutions are particularly difficult to realize with the comparatively larger coffee bean multi-containers, and multiple such closing units are required for the multiple bean outlets.

DE 31 42 348 A1 discloses a coffee grinder with a crushing gear and a storage container arranged above it, from which coffee beans are supplied into the crushing gear.

DE 10 2007 008 900 A1 describes a bean container for a drinks machine, with a container for storing beans, with a delivery opening for supplying the beans into a crushing gear.

DE 20 2011 005 003 U1 discloses a twin-chamber bean container of a coffee machine having two separate bean chambers and a joint bean container outlet arranged in the bottoms of said chambers.

SUMMARY OF THE INVENTION

Based upon the above-mentioned prior art, the object underlying the invention is to provide a coffee bean multi-container, in particular a double coffee bean container, namely a coffee bean container with multiple separate bean compartments, which can be operated in a comfortable manner in view of closing and locking to the coffee grinder or coffee machine with integrated coffee grinder. Here, the coffee bean container, in particular the actuation mechanism used, is to have a most simple structure and robust design. Furthermore, the object is to provide a coffee grinder or a coffee machine with integrated coffee grinder having a coffee bean container improved in such a way. Furthermore, the object is to provide an operating method for optimized operation of a coffee bean container.

Said object is achieved, with respect to the coffee bean container, by the features disclosed herein and, with respect to the coffee grinder respectively the coffee machine with integrated coffee grinder, by means of the features also disclosed herein. With respect to the operation method, the object is also achieved by means of the features disclosed herein.

Advantageous developments of the invention are indicated in the sub-claims. The scope of the invention also includes any combinations of at least two features disclosed in the description, the claims and/or the figures.

For the avoidance of repetitions, features disclosed for the device shall be deemed to be disclosed and claimable for the method as well. Just as well, features disclosed for the method shall be deemed to be disclosed and claimable for the device as well.

The coffee bean container according to the invention is a multi-container, in particular a double- or twin-container with at least two bean compartments, each comprising one bean outlet. The bean outlets of the coffee bean container according to the invention can be closed using closure means that are arranged above or below the bean outlets, in order to prevent that beans possible still located in the bean compartments might fall out of the bean outlets when removing the coffee bean container. In addition to the closure means, locking means are provided, in order to be able of securing, i.e. locking, the coffee bean container to the coffee grinder or to the coffee machine (with integrated coffee grinder) in a releasable manner. According to the invention, the coffee bean container comprises one, in particular a single actuating element, with which both the closure means and the locking means are actuatable. Here, the actuating element interacts with the closure means in such a way, that by the actuation thereof, a simultaneous opening and closing movement of the closure means relative to all bean outlets results in particular at least over a time frame—in other words, all bean outlets of the plurality of bean compartments are closable and/or openable by adjustment of the actuating element relative to the bean compartments. In order to achieve a most simple and robust handling, it is possible to lock or unlock simultaneously with the opening and closing of all bean outlets by actuation of the actuating element of the coffee bean container on the coffee grinder or the coffee machine with integrated coffee grinder, in particular a corresponding housing. In other words, according to the invention, an (actuating) mechanism comprising an actuating element for actuating both the closing means for opening and/or all bean outlets and for locking and/or unlocking the locking means, in particular at least over a time frame, is provided. This means that according to a first option by actuating the actuating element, in particular with a single actuating movement, both all bean outlets can be opened using the closure means and, in addition, in particular by the same actuation movement of the actuating element, the locking means are lockable. According to a second option, which can be realized in addition to or as an alternative to the above-mentioned first option, it is provided that both all bean outlets are closeable and the locking means are unlockable by actuating the actuating element, in particular with a single actuating movement.

The coffee bean container according to the invention can be operated in a particularly simple manner due to the design and arrangement of the actuating element or the assignment thereof, in particular mechanical coupling via a corresponding actuation mechanism both to the closure means and to the locking means. Furthermore, it is possible that both an opening of all bean outlets and a locking of the locking means is actuated and/or both all bean outlets are closed and the locking means are unlocked with a single actuating movement of the actuating element relative to the bean compartments, i.e. adjustment of the actuating element along a defined movement path or by rotation of the movement element around a rotation axis in a single rotation direction. Here, the particular advantage is that the above processes do not have to be actuated separately by means of different actuating elements or mechanisms, but that this is possible by actuation of a common actuating element—furthermore, it is of particular advantage that the closure means are designed in such a way that all bean outlets are openable and/or closeable by actuating said closure means by means of the actuating element.

In a development of the invention, it is advantageously provided, that the actuating element is arranged to be rotatable relative to the bean compartments around a rotation axis, in order to thus open all bean outlets and to also lock the locking means by a single rotation movement and/or to close all bean outlets and unlock the locking means by a rotation movement, preferably a single (reverse to the above rotation movement) rotation movement. Here, according to the development, it is provided that the rotation movement of the actuating element is converted by suitable (conversion) means into a translatory displacement movement of the closure means and the locking means, so that the closure means can be displaced relative to the bean outlets in a translatory manner, and, preferably simultaneously over at least one time frame, a relative movement of locking means to the bean compartments respectively to the coffee grinder or the coffee machine results. By the conversion of the rotation movement of the actuation element into a translatory displacement movement of both the closure means and the locking means, large degrees of freedom are achieved in view of the specific design of the closure and locking means and, in addition, the timely adjustment of the individual movement steps for opening or closing the bean outlets as well as achieving the unlocking or locking position can be influenced by simple measures, as will yet be explained hereinafter.

In view of the design of the closure means, there are different options. According to a first variant, the locking means are designed in such a way that all bean outlets are closed at a common closure time by actuating the actuation element. This means that the closure means terminate the closure process for closing all bean outlets at a common point of time, i.e. a closure end position of the closure means is reached commonly at all bean outlets. According to an alternative configuration variant, at least two of the bean outlets are closed at different times by a corresponding design of the closure means so that at least one of the bean outlets at a certain point of time is opened to a greater extent than another one of the bean outlets. This reduces the probability that two bean outlets are blocked by beans at the same time and the closing force to be applied for breaking the beans doubles as a result. Rather, in the case that beans are located in the closure path of the closure means in two bean outlets, these beans can be broken one after the other by the timely offset closing procedure.

Particularly preferred is an embodiment of the coffee bean container, in which the closure and locking means are designed in such a way and can be actuated via the common actuating element in such a way that a closing movement of the closure means for closing the bean outlets is adapted to an unlocking movement of the locking means in such a way that at least one closing process for closing one of the bean outlets, preferably all closing processes for closing all bean outlets, has/have not yet been completed when the locking means have reached the unlocking position thereof. Thus, according to a development, it is provided that the coffee bean container is removable even from a coffee grinder or a coffee machine assigned to it prior to the closing process for closing all bean outlets. Thus, a remaining gap is accepted in unlocked locking means which is preferably dimensioned in such a way (in particular a gap width of less than 0.6 mm) that coffee beans can not fall out of the corresponding bean compartment any more, in order that the closing process for closing the bean outlets does not have to be fully completed in the case that a bean is jammed in order to be able to remove the coffee bean container from the coffee grinder or the coffee machine. This development considers the fact that a possibly jammed bean significantly increases the closing force for the complete closure of the bean outlets.

It is very particularly preferred, in particular for the realization of the above-mentioned translatory displacement movement, if the locking means and the closure means comprise slider means, which by actuating the actuating element can be slid or displaced in a translatory manner and preferably thereby open or close the bean outlets and lock or unlock the coffee bean container. Generally, it is possible to provide separate slider means or slider elements for the locking means and the closure means—it is very particularly preferred if the locking means and the closure means comprise common slider means, in particular a common slider element, which preferably simultaneously causes the opening and closing function with respect to the bean outlets and the locking and unlocking function, in particular by a cooperation of a corresponding counter or locking element, preferably on the side of the coffee grinder or the coffee machine.

In a manner particularly advantageous in terms of construction, a conversion of a rotational actuation movement of the actuating element into a translatory displacement movement of the slider means along a straight-line movement path is converted by means of a rack and pinion gear, wherein to that end, preferably a toothed gear co-rotational with the actuating element or designed integrally with said actuating element interacts directly or alternatively indirectly, in particular via at least one additional toothed gear, with a rack assigned to the one or more slider means, in order to thereby cause a translatory displacement movement of the one or more slider means by a rotation of the actuating element. It is very particularly preferred when the rack engages with a further (counter bearing) toothed gear on a side facing away from the toothed gear transmitting the rotational movement of the actuating element, which additional gear is co-rotated by a translatory adjustment of the rack due to the engagement into the rack. Preferably, the above-mentioned rack and pinion gear comprises a shaft extending parallel to the longitudinal central axes of the bean of the bean outlets and/or perpendicular to a surface extension of the slider means, which shaft forms the entire actuating element or which can be rotated by said element, wherein the afore-mentioned shaft preferably supports a toothed gear or is formed integrally with a toothed gear, which directly or indirectly actuates the rack assigned to the one or more slider means.

Particularly preferable is a design of the coffee bean container, in which the slider means comprise recesses formed in particular as peripherally closed through-openings, with one recess being assigned to each of the bean outlets. The recesses are aligned with the bean outlets if the bean outlets are open so that the beans can fall down through the bean outlets and the recesses due to the gravitational force. If the bean outlets are closed, the recesses are displaced relative to said outlets and the bean outlets are blocked, preferably directly by the slider means.

Preferably, the slider means comprise a serrate edge or serrate edge portion in the peripheral region of the recesses, in order to thereby increase the surface pressure for breaking a coffee bean possibly located in the path.

Particularly appropriate is an embodiment, in which all above-mentioned recesses, which at least partially may be designed as recesses open on the edge side(s), are arranged in a common slider element. In particular in an embodiment in which the slider means comprise recesses, which are aligned with bean outlets in their open position, it can be realized in a manner simple in terms of construction to offset the closure timings of different bean outlets in time, by means of a correspondingly offset arrangement of the recesses on the slider means, in particular on the common slider element. In addition or as an alternative, different closure timings can be realized in that at least two recesses have a different longitudinal extension in the displacement direction of the slider means, in order to thereby realize different end closure timings, with the aim to prevent that multiple coffee beans are to be broken simultaneously using the slider means.

According to a particularly advantageous embodiment of the invention, it is provided that the slider means, in particular the slider element, of the closure means does/do at least not directly close the bean outlets over the entire surface extension of the bean outlets, but that the slider means are assigned at least one closure element, preferably separate closure elements for multiple bean outlets, which are preferably adjustable together with the slider means in a translatory manner, wherein the at least one closure element serves to decouple the displacement movement of the slider means from the actual closure of the bean outlets, in order to enable an actuation of the actuation means in an actuation end position, in particular in a rotation end position, even though one of the closure elements can not be adjusted into an assigned closure end position due to a coffee bean being captured in the respective bean outlet. Here, the at least one closure element is preferably adjustable together with the slider means, however also relative to them, so that the adjustment movement of the slider means via the actuating element can be continued even if the movement of the at least one closure element delays or said movement is blocked, for example by a coffee bean. In terms of construction, this can be realized in a particularly simple manner in that the at least one closure element is spring-loaded in the direction of its closure end position, wherein the spring is preferably supported in the slider means on the one hand, and on the other hand in the closure means. If a coffee bean is located between an opening edge of a bean outlet opening and a front closure element edge in such an arrangement, the coffee bean stops the further movement of the closure element, wherein the at least one spring (spring means) assigned thereto is loaded. However, at the same time, the slider means are displaced further in the direction of their end position. If now the coffee bean brakes or falls out downward at any time, the spring-loaded closure element can be automatically adjusted into its closure end position relative to the slider means preferably yet fixed then.

Preferred is an embodiment, in which each bean outlet is assigned a distinct closure element. Generally, it is also possible to assign one closure element to in each case a single bean outlet or a selection of bean outlets. It is also conceivable to assign one common closure element to multiple, in particular all outlets.

A particularly comfortable operation of the coffee bean container or actuation of the actuating element is achieved if the actuating element is arranged in such a way that it can be actuated from an upper side of a coffee bean container. It is very particularly preferable here, if the actuating element is arranged between two separate, removable covers for the bean compartments.

The invention also relates to a coffee grinder or a coffee machine with integrated coffee grinder and a coffee bean container formed according to the concept of the invention which can be locked thereto in a releasable manner, which comprises at least two separate bean compartments, each comprising one bean outlet. The invention also relates to an operating method for operating a coffee bean container or a method for commonly open the bean outlets and locking the locking means and/or commonly closing all bean outlets and unlocking the locking means. According to the invention, it is provided that an actuating element is actuated and both, all bean outlets are opened, and the locking means are locked by said actuation, in particular with a single actuation movement, and/or the actuating element is actuated, in particular in an opposite or reverse actuating direction, thereby closing all bean outlets and unlocking all locking means, in order to thus be able to remove the coffee bean container from the coffee grinder or coffee machine and to thereby prevent coffee beans from falling out of the bean compartments.

Further advantages, features and details of the invention result from the following description of preferred exemplary embodiments as well as from the drawings.

DETAILED DESCRIPTION

Figure 1:
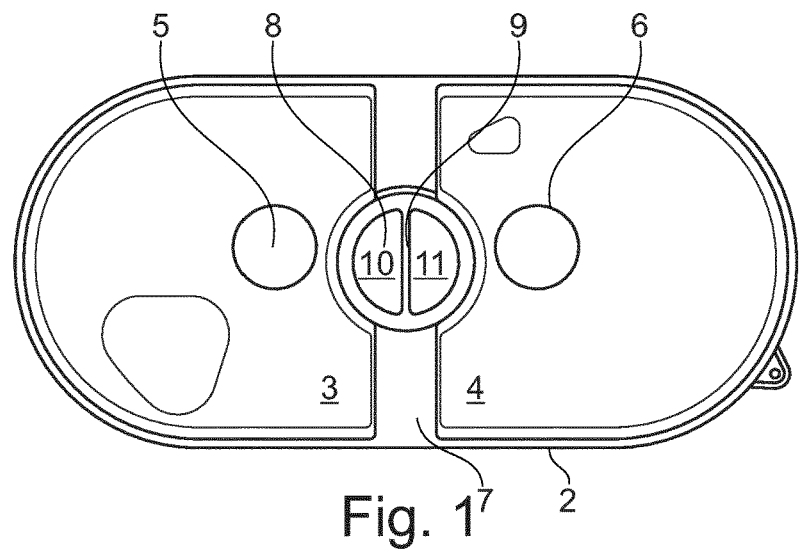
FIG. 1 a view of a coffee bean container formed as a double bean container according to the invention, FIG. 2 an illustration of the actuating mechanism of the coffee bean container according to FIG. 1, wherein locking means are locked and bean outlets are open, FIG. 3 a view of the actuation mechanism, wherein here the locking means are unlocked and the closure means have not completely closed the bean outlets, FIG. 4 a lateral view of the actuation mechanism for visualization of a slider means drive or rack and pinion drive, respectively, FIG. 5 an alternative embodiment of the actuation mechanism for offset closure of the outlet openings, and FIG. 6 a strongly schematized illustration of an alternative embodiment of the closure means, wherein here the slider means carry closure elements supported in a spring-mounted manner, which are adjustable relative to the slider means, in order to thus decouple an actuation movement of the actuating element from an actual closing movement.

FIGS. 1 to 4 show a first exemplary embodiment of a coffee bean container 1, in this case of a coffee bean container configured as a double bean container. In a top view from above in FIG. 1, in which no closure covers are shown for reasons of clarity, it can be discerned that the coffee bean container 1 comprises a housing 2, which encloses a first bean compartment 3 and a second bean compartment 4 separated therefrom. A first and a second bean outlet 5, 6 are provided in the base area of the bean compartments 3, 4, through which coffee beans can fall downwards in direction of a coffee grinder (not illustrated here) only by gravity.

As can be seen from the top view according to FIG. 1, the two bean compartments 3, 4 are separated from one another by a vertical separation wall 7 having an actuating element 8 integrated therein. The actuating element 8 is configured as a rotary handle and comprises two depressions 10, 11 separated by a web 9 for engaging with two fingers of a user. A deeper plane of the coffee bean container 1 can be seen in FIG. 2, bean compartments 2, 4 are not shown. However, it can further be discerned the rotatably-arranged actuating element 8, by means of which closing elements 12 as well as locking means 13 can be actuated, namely by a rotational movement of the actuating element 8.

The closing means 12 serve for opening and closing the bean outlets 5,6, while locking elements 13 can lock in the coffee bean container 1 on a coffee machine or a coffee grinder.

Closing elements 12 as well as locking elements 13 comprise common slider means 14 in the form of a joint, respectively single slider element 15, which can be adjusted in the image plan from the right to the left and from the left to the right, namely actuated form the right to the left and from the left to the right, namely actuated by a rotational movement of the actuating element 8.

For converting a rotational movement of the actuating element 8, respective means 16 are provided. Said means comprise a rack and pinion gear 17, which in turn comprises a rotary shaft 18, actuating means 8 being arranged on the front side of said gear.

The shaft 18 extends perpendicular to the surface extension of the slider means 14 and to the longitudinal middle length axes of the bean outlets 5,6.

A first toothed gear 19 is provided torque-proof with the shaft 18 in the end region of the shaft 18 facing away from the actuating element 8, said gear being rotated by rotation of the actuating element 8 via the shaft 18. The first toothed gear 19 engages with a second toothed gear 20 located on the same level and meshing with a rack 21, which is configured as an injection-molded plastic part integral with the slider element 15 in the exemplary embodiment shown.

On the side of the rack 21 opposite the second toothed gear 20, a support gear 22 is arranged as an abutment and is rotatably arranged on a housing bolt 23 thus ensuring optimum guidance of the slider means 14 upon the sliding movement thereof.

Figure 2:
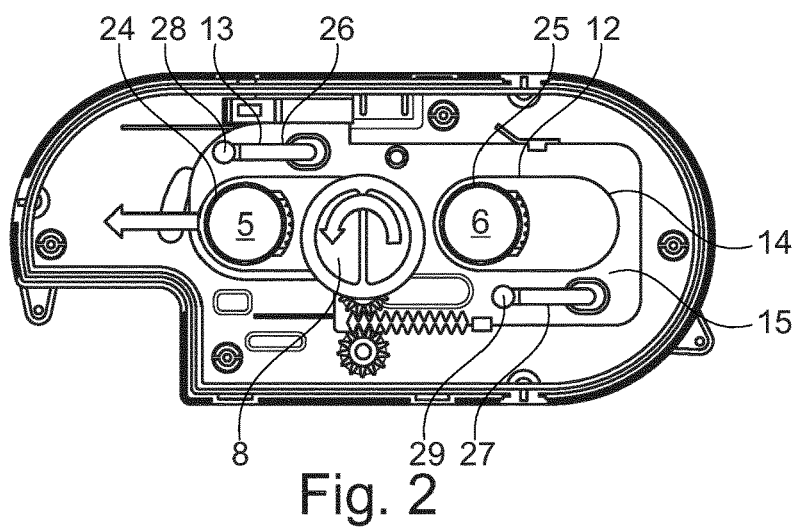

It can be taken from the Figures that the sliding means comprise recesses 24, 25 assigned to the bean outlets 5, 6, which are aligned with the bean outlets 5, 6 in the opening position of the slider means 14 shown in FIG. 2, so that due to gravitation, beans can exit downwards. In one closure end position of the slider means 14, which position is almost taken in FIG. 3, recesses 24, 25 are laterally displaced and are no longer aligned with bean outlets 5, 6 so that the bean outlets 5,6 are closed, in this case in an exemplary manner by slider means 14 or the sliding element 15, respectively.

In the exemplary embodiment shown, for realizing the locking means, the slider means 14, or respectively the (one) slider element 15 comprise(s) two elongated through openings 26, 27, wherein basically also an individual longitudinal through opening 14, extending in the adjustment direction of the slider means 14, would be sufficient. However, two longitudinal through openings 26, 27 are advantageous in order to prevent improper levering of the coffee bean container 1. The elongated passages 26, 27 will be inserted in the coffee bean container 1 a in a region below the bean compartments 3, 4, penetrated by locking bolts 28, 29 of the coffee grinder or the coffee machine, respectively, wherein the locking bolts 28, 29 comprise a thickened upper end so that the coffee bean container 1 cannot be removed as long as the locking bolts 28, 29 are trapped in the assigned, longitudinal through openings 26, 27. In order to unlock the locking means, the slider means 14, respectively the joint slider element 15, has to be adjusted to the left in the image plan in a translatory manner, from the locking position shown in FIG. 2 in which the bean outlets 5, bare also closed, into a position shown in FIG. 3, namely by means of rotating the actuating element 8 in the rotational direction, as it is indicated in FIG. 2, around a rotational axis arranged perpendicular to the image plane. Thereby, locking bolts 28, 29 enter assigned release openings 30, 31 connected with the longitudinal through-openings 26, 27 in the slider means 14, the cross-section of which allows for them to be lifted off via the thickened ends of the locking bolts 28, 29, so that the coffee bean container 1 is unlocked and can be removed from the coffee grinder and the coffee machine, respectively.

The combination of longitudinal through-openings 26, 27 and the locking bolts 28, 29 have at the same time a guiding function toward the axial guidance of the slider means 14 during the translatory sliding movement thereof.

Figure 3:
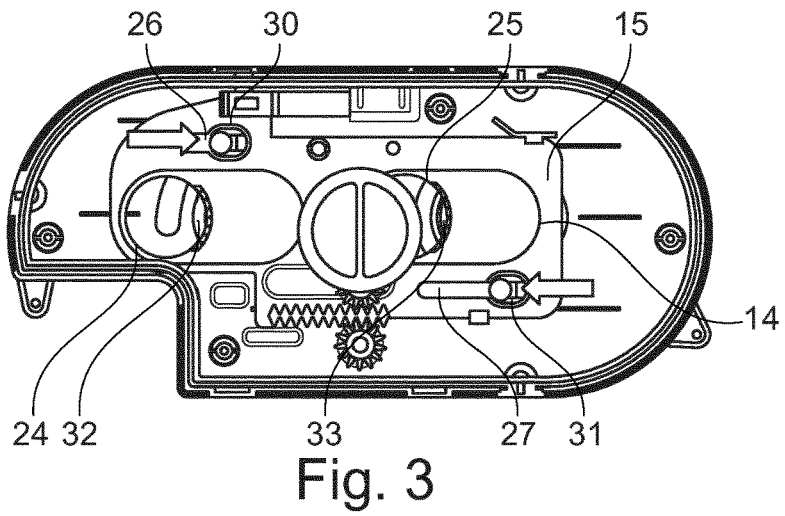
Figure 4:
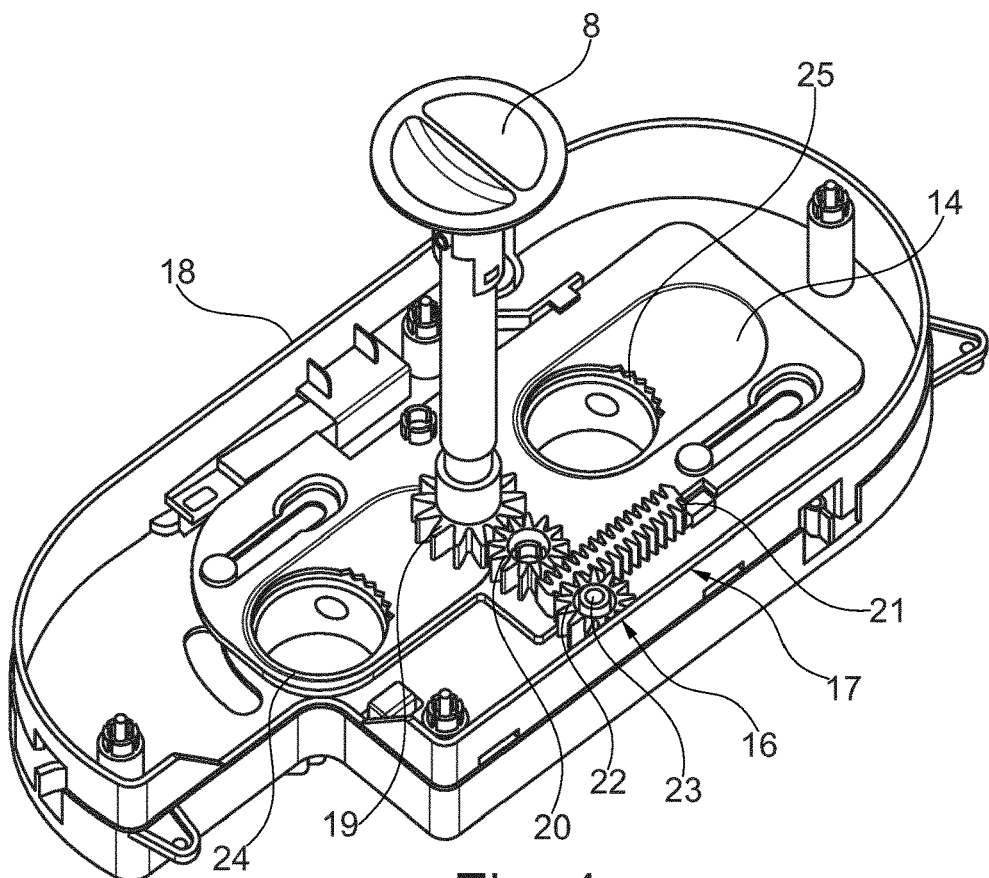

FIG. 3 now shows a particularly advantageous configuration, according to which the locking position of the locking means is achieved, if the closing means 12 have not yet completely closed the bean outlets 5, 6, respectively if a final adjustment position of the closing means has not yet been reached. A remaining gap 32, 33 between the outlet openings and the closing means shall be accepted in this case. Said gap is preferably dimensioned in such a way that no more beans can pass therethrough.

The distance that can maximally be covered by the closing elements extends only over a partial section of the total movement distance of the slider means, said way being preferably 0.4 cm, even further preferred at least 0.6 cm and/or preferably less than 2 cm, in particular less than 1.6 cm.

Figure 5:
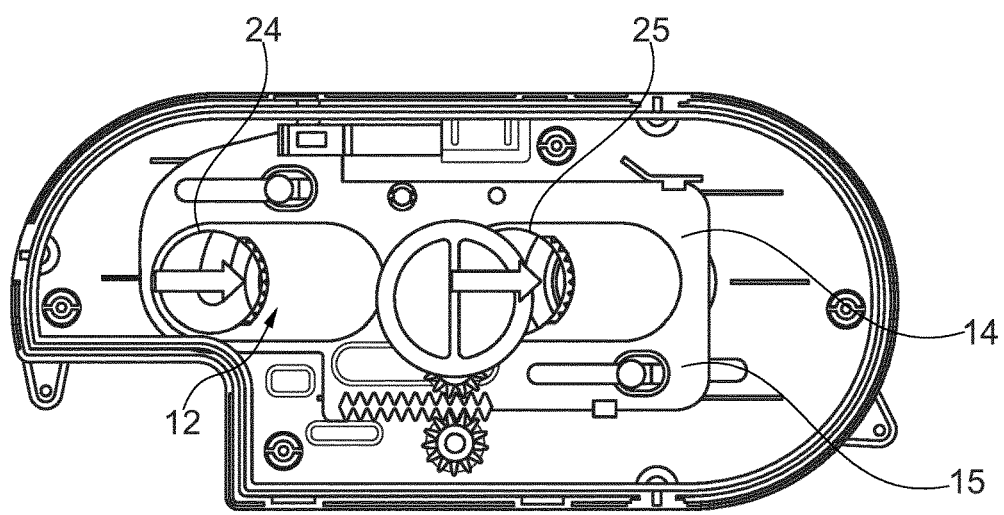

FIG. 5 shows an alternative embodiment of the actuating mechanism. In order to prevent repetitions, only the differences to the exemplary embodiment according to FIGS. 1-4 are explained. In the exemplary embodiment according to FIG. 5, the extension of the recesses 24, 25 is different in terms of the adjustment direction of the slider means 14 or the slider element 15, wherein the right recess 25 shown in the image plan has a larger extension in said direction, such that the closing means 12 closing the left bean outlet prior to the right bean outlet—in other words, upon a translatory adjustment of the slider means 14, the left recess 24 travels from the right recess 25 out of the covering with the respective bean outlet. As a result, it is prevented that two coffee beans have to be crushed at the same time.

Figure 6:
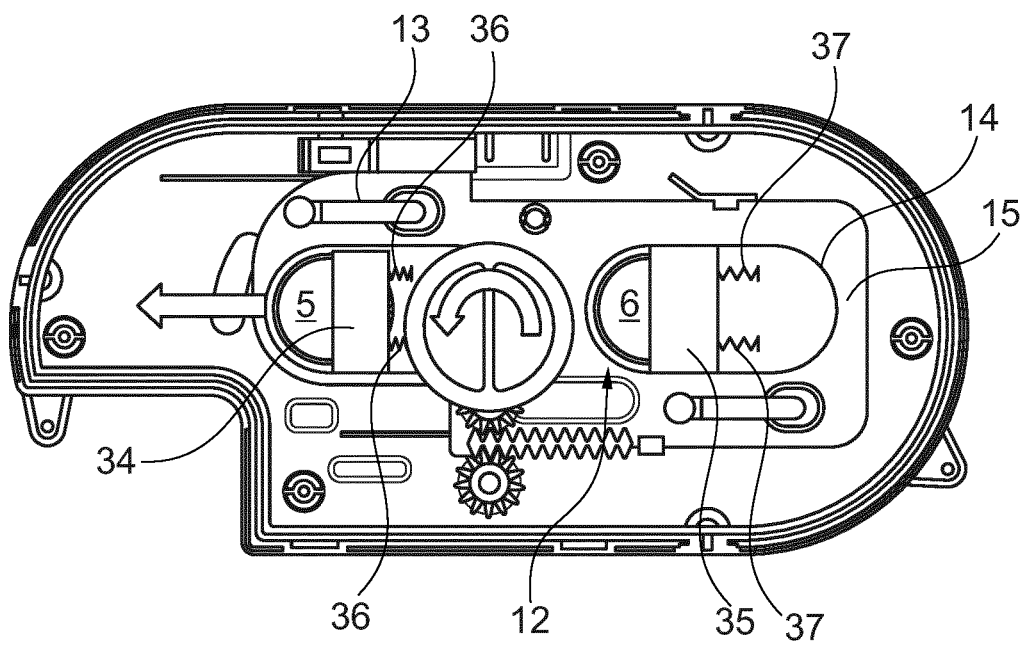

FIG. 6 shows the basic functional principle of an alternative configuration of the actuating mechanism. Here, closing means 12 comprise closure elements 34, 35 assigned to the slider means 14 which can be adjusted in a translatory manner together with the slider means 14, and are furthermore adjustable relative to the slider means 14, in the case that a coffee bean is located in the closing area. In this case, the respective closure element 34, 35 in fact stops, spring elements 36, 37 with which the closure means are supported directly or indirectly on the slider means, are loaded upon a further movement actuated by the actuating element of the slider means 14.

This way, the closing movement of the slider means is not prevented, i.e. the slider means 14 or the single slider means 15 can be moved to a closure end position and still, at least one bean outlet 5, 6 can be opened due to the adjustment of the slider elements 15 relative to at least one of the closure elements 34, 35. Once the coffee bean has been removed from the engagement area, the respective closure element 34, 35 automatically closes the assigned bean outlets 5, 6 with the spring elements 36, 37 relaxing to that end.

The invention claimed is:

1. Coffee bean container for releasably fixing on a coffee grinder or a coffee machine having an integrated coffee grinder, the coffee bean container comprising a first bean compartment (3) comprising a first bean outlet (6) and at least one second bean compartment (4) comprising a second bean outlet (6), closure means (12) assigned to the bean outlets (5, 6) for closing the bean outlets (5, 6), locking means (13) for locking the bean container to the coffee grinder or to the coffee machine, and an actuating element (8) actuatable by a user and moveable relative to the bean compartments (3, 4), wherein the actuating element (8) is designed and arranged for both opening all bean outlets (5, 6) and for locking the locking means (13) with a single actuating movement, and/or both for closing all bean outlets (5, 6) and unlocking the locking means (12) with a single actuating movement, wherein the closure means (12) are designed in such a way that all bean outlets (5, 6) are closed at a common closure time or wherein the closure means (12) are designed in such a way that the first and the second bean outlets (5, 6) can be closed temporarily offset.

2. Coffee bean container according to claim 1, wherein the actuating element (8) is arranged to be rotatable around a rotation axis, and wherein the actuation element (8) is assigned means (16) for converting a rotating actuating movement into a translatory displacement movement of the closing means (12) and the locking means (13).

3. Coffee bean container according to claim 1, wherein the closure means (12) and the locking means (13) are actuatable by means of the common actuating element (8) in such a way that a closure movement of the closure means (12) for closing the bean outlets (5, 6) is adapted to an unlocking movement of the locking means (13) in such a way that at least one closing movement for closing one of the bean outlets (5, 6) is/are not yet completed when the locking means (13) have reached their unlocking position.

4. Coffee bean container according to claim 1, wherein the locking means (13) and the closure means (12) comprise separate or common slider means (14), which can be displaced in a translatory manner by actuating the actuating element (8).

5. Coffee bean container according to claim 4, wherein a rack and pinion gear (17) is provided for the conversion of rotational actuation movement of the actuating element (8) into a translatory displacement movement of the slider means (14).

6. Coffee bean container according to claim 5, wherein the rack and pinion gear (17) comprises a shaft extending parallel to the longitudinal central axes of the bean outlets (5, 6) and/or perpendicular to a surface extension of the slider means (14), which forms the actuating element (8) or can be rotated by this element.

7. Coffee bean container according to claim 4, wherein the slider means (14) comprise recesses (24, 25) for the bean outlets (5, 6) which are formed as peripherally closed through openings (26, 27), which are flush with the bean outlets if said bean outlets (5, 6) are open.

8. Coffee bean container according to claim 4, wherein the actuating movement of the actuating element (8) is at least partially decoupled from a closure movement of at least one-closure element/s (34, 35) of the closure means (12) that can be adjusted together with the slider means (14), in order to allow actuating the actuating elements into an actuation end position even if one of the closure elements (34, 35) can not be adjusted in a closure end position due to a coffee bean being trapped in the assigned bean outlet (5, 6).

9. Coffee bean container according to claim 8, wherein at least one of the closure elements (34, 35) is arranged in a spring-loaded manner in the direction of its closure end position, in particular on the slider means (14).

10. Coffee bean container according to claim 1, wherein the actuating element (8) is actuatable from a top side of the coffee bean container and is arranged in an area between two separate, removable covers for the bean compartments (2, 3).

11. Coffee grinder or coffee machine with integrated coffee grinder and a coffee bean container (1) that can be releasably locked thereto according to claim 1.

12. Method of operating a coffee bean container having a first bean compartment (3) comprising a first bean outlet (6) and at least one second bean compartment (4) comprising a second bean outlet (6), closure means (12) assigned to the bean outlets (5, 6) for closing the bean outlets (5, 6), locking means (13) for locking the bean container to the coffee grinder or to the coffee machine, and an actuating element (8) actuatable by a user and moveable relative to the bean compartments (3, 4), wherein by actuating the actuation element (8) by means of a single actuation movement, both all bean outlets (5, 6) are opened and the locking means (12) are locked, and/or by actuating the actuating element (8) by means of a single actuating movement (8), both all bean outlets (5, 6) are closed and the locking means (12) are unlocked, wherein the closure means (12) are designed in such a way that all bean outlets (5, 6) are closed at a common closure time or wherein the closure means (12) are designed in such a way that the first and the second bean outlets (5, 6) can be closed temporarily offset.

13. Coffee bean container according to claim 3, wherein all closing movements for closing all bean outlets (5, 6) are not yet completed when the locking means (13) have reached their unlocking position.

14. Coffee bean container according to claim 7, wherein all recesses (24, 25) for the bean outlets (5, 6) are arranged on a common slider element (15).

15. Coffee bean container according to claim 8, wherein the actuating movement of the actuating element (8) is at least partially decoupled from a closure movement of all closure elements (34, 35).

16. Coffee bean container according to claim 8, wherein the actuation and position is a rotation end position.

* * * * *